(12) United States Patent
Han

(10) Patent No.: US 11,374,398 B1
(45) Date of Patent: Jun. 28, 2022

(54) POWER MANAGEMENT SYSTEM

(71) Applicant: Moxa Inc., New Taipei (TW)

(72) Inventor: Jui-Cheng Han, New Taipei (TW)

(73) Assignee: Moxa Inc., New Taipei (TW)

( * ) Notice: Subject to any disclaimer, the term of this patent is extended or adjusted under 35 U.S.C. 154(b) by 0 days.

(21) Appl. No.: 17/327,804

(22) Filed: May 24, 2021

(30) Foreign Application Priority Data

Dec. 11, 2020 (TW) ................................ 109143876

(51) Int. Cl.
*H02H 7/26* (2006.01)
*H02H 1/00* (2006.01)

(52) U.S. Cl.
CPC ............ *H02H 7/26* (2013.01); *H02H 1/0007* (2013.01)

(58) Field of Classification Search
CPC .......... H01C 7/12; H02H 1/0007; H02H 7/26; H02H 9/02; H02H 9/041; H02H 9/042; H02H 9/06
See application file for complete search history.

(56) References Cited

U.S. PATENT DOCUMENTS

| | | | | |
|---|---|---|---|---|
| 3,848,156 A | * | 11/1974 | Tolstov | .................... H02H 9/04 |
| | | | | 315/36 |
| 9,618,586 B2 | | 4/2017 | Nuqui | |
| 2009/0154034 A1 | * | 6/2009 | Tallam | .................... H02H 9/06 |
| | | | | 361/56 |
| 2014/0092514 A1 | * | 4/2014 | Chen | ........................ H01C 7/12 |
| | | | | 361/118 |
| 2017/0117699 A1 | | 4/2017 | Ostrovsky | |
| 2018/0138697 A1 | * | 5/2018 | Crevenat | ................ H02H 9/043 |
| 2019/0244732 A1 | * | 8/2019 | Hoffmann | ................. H01T 1/16 |
| 2019/0356127 A1 | | 11/2019 | Ostrovsky | |

FOREIGN PATENT DOCUMENTS

| | | | |
|---|---|---|---|
| CN | 111856127 A | 10/2020 | |
| CZ | 29 467 U1 | 5/2016 | |
| DE | 102015016232 A1 * | 6/2017 | ............. H02H 9/041 |
| DE | 102019135206 A1 * | 6/2021 | ............... H01C 7/12 |
| EP | 3 016 115 A1 | 5/2016 | |
| EP | 3 407 460 B1 | 8/2020 | |
| EP | 3839983 A1 * | 6/2021 | ............... H01C 7/12 |
| KR | 10-1332304 B1 | 11/2013 | |

* cited by examiner

*Primary Examiner* — Adi Amrany
*Assistant Examiner* — Nicolas Bellido
(74) *Attorney, Agent, or Firm* — Winston Hsu

(57) ABSTRACT

A power management system includes a first power line, a second power line, a first parallel protector, a second parallel protector, a third parallel protector, a first current sensor, a second current sensor, a third current sensor, and a processor. The first parallel protector is coupled to the first power line. The second parallel protector is coupled to the first parallel protector and the second power line. The third parallel protector is coupled to the first parallel protector and a ground terminal. The first current sensor, the second current sensor and the third current sensor respectively sense a first current flowing through the first parallel protector, a second current flowing through the second parallel protector, and a third current flowing through the third parallel protector. The processor detects a surge discharging path according to the first current, the second current and/or the third current.

8 Claims, 3 Drawing Sheets

POWER MANAGEMENT SYSTEM

CROSS REFERENCE TO RELATED APPLICATION

This application claims priority of Taiwan Application No. 109143876 filed on 2020 Dec. 11.

BACKGROUND OF THE INVENTION

1. Field of the Invention

The present invention is related to a power management system, and more particularly, to a power management system capable of monitoring power surges.

2. Description of the Prior Art

Electrical equipment in industrial or outdoor environment is often prone to damage due to power surges. In addition to the obvious precautions, most businesses will also employ some version of surge protection to guard against the dangers of power surges. However, a prior art surge protection circuit can only provide surge discharging paths to bypass power surges, but is unable to record the time of the surge occurrence and the actual surge discharging path. Therefore, the user may not be able to figure out the cause of power surges for providing further protection accordingly.

In a prior art power management system, the status of the power supply is normally monitored by sensing circuits which are coupled in parallel with or in series to the power lines. However, when power surges or other abnormalities occur, the function of the sensing circuits may also be influenced and thus fail to record power surges or other abnormalities.

SUMMARY OF THE INVENTION

The present invention provides a power management system which includes a first power line, a second power line, a first parallel protector, a second parallel protector, a third parallel protector, a first current sensor, a second current sensor, a third current sensor, and a processor. The first power line and the second power line are used to transmit an AC power. The first parallel protector includes a first end coupled to the first power line and a second end. The second parallel protector includes a first end coupled to the second end of the first parallel protector and a second end coupled to the second power line. The third parallel protector includes a first end coupled to the second end of the first parallel protector and a second end coupled to a ground. The first current sensor is configured to sense a first current flowing through the first parallel protector. The second current sensor is configured to sense a second current flowing through the second parallel protector. The third current sensor is configured to sense a third current flowing through the third parallel protector. The processor is coupled to the first current sensor, the second current sensor and the third current sensor, and configured to detect a surge discharging path according to at least the first current, the second current and/or the third current.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
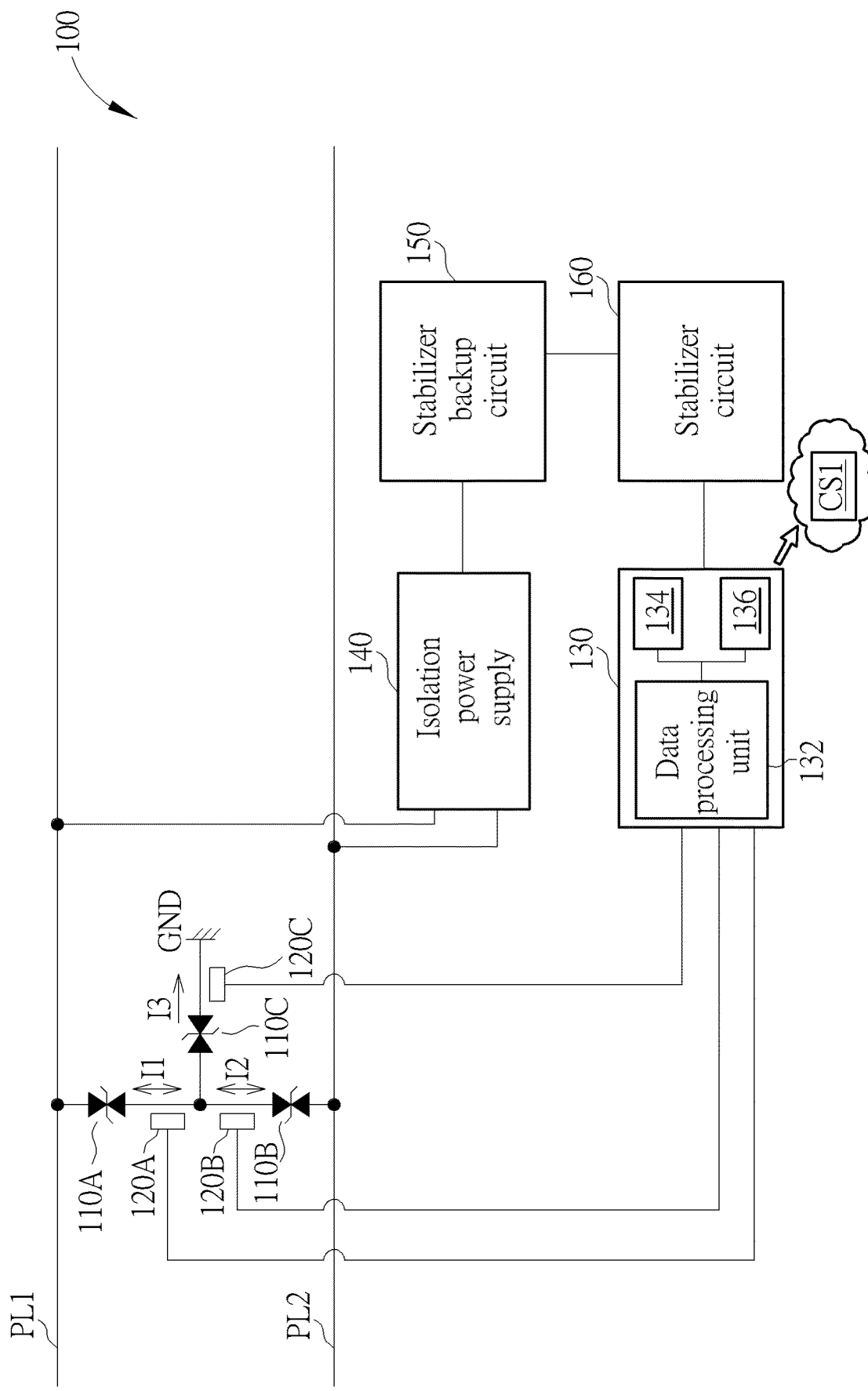
FIG. 1 is a diagram illustrating a power management system according to an embodiment of the present invention.

FIG. 1 is a diagram illustrating a power management system 100 according to an embodiment of the present invention. The power management system 100 includes a first power line PL1, a second power line PL2, a first parallel protector 110A, a second parallel protector 110B, a third parallel protector 110C, a first current sensor 120A, a second current sensor 120B, a third current sensor 120C, and a processor 130.

In some embodiments, both the first power line PL1 and the second power line PL2 are used to transmit alternative-current (AC) power for supplying the operation of electrical equipment. When the electrical equipment is disposed in an industrial or outdoor environment, the supply of the AC power may fluctuate due to environmental changes, thereby resulting in power surges. In order to protect the operation of electrical equipment from interferences, the power management system 100 provides surge discharging paths using the first parallel protector 110A, the second parallel protector 110B and the third parallel protector 110C, thereby preventing the power surges generated on the first power line PL1 and the second power line PL2 from damaging the electrical equipment. Meanwhile, the processor 130 may be coupled to the first current sensor 120A, the second current sensor 120B and the third current sensor 120C for monitoring the waveform of the AC power according to the current detected by the first current sensor 120A, the second current sensor 120B and the third current sensor 120C.

In the embodiment depicted in FIG. 1, the first parallel protector 110A includes a first end coupled to the first power line PL1 and a second end. The second parallel protector 110B includes a first end coupled to the second end of the first parallel protector 110A and a second end coupled to the second power line PL2. The third parallel protector 110C includes a first end coupled to the second end of the first parallel protector 110A and a second end coupled to a ground GND.

The first current sensor 120A may be disposed near the first parallel protector 110A and configured to sense a first current I1 flowing through the first parallel protector 110A. The second current sensor 120B may be disposed near the second parallel protector 110B and configured to sense a second current I2 flowing through the second parallel protector 110B. The third current sensor 120C may be disposed near the third parallel protector 110C and configured to sense a third current I3 flowing through the third parallel protector 110C.

In some embodiments, the first current sensor 120A, the second current sensor 120B and the third current sensor 120C may be Hall sensors. A Hall sensor is an electronic device designed to measure a varying magnetic field and convert its findings into electrical data, thereby providing proximity sensing. In other words, the first current sensor 120A, the second current sensor 120B and the third current sensor 120C, implemented by Hall sensors and disposed without contacting the first parallel protector 110A, the second parallel protector 110B and the third parallel protector 110C, are capable of sensing the current flowing through the first parallel protector 110A, the second parallel protector 110B and the third parallel protector 110C by means of electromagnetic induction. Under such circumstance, the first current sensor 120A, the second current sensor 120B and the third current sensor 120C can maintain normal operation when power surges occur. Also, with the fast response speed of Hall sensors, the processor 130 can record the current waveform when power surges occur, thereby allowing the user to improve and plan for the power transmission.

In some embodiments, the impedance of the first parallel protector 110A, the second parallel protector 110B and the third parallel protector 110C may be higher under normal AC power, and the current detected by the first current sensor 120A, the second current sensor 120B and the third current sensor 120C is thus negligible. However, when the voltages established across the first parallel protector 110A, the second parallel protector 110B and the third parallel protector 110C raise above respective upper design limits, for example due to a power surge, the impedance of the first parallel protector 110A, the second parallel protector 110B and the third parallel protector 110C may drop, thereby providing a surge discharging path between the first power line PL1 and the second power line PL2.

In some embodiments, each of the first parallel protector 110A, the second parallel protector 110B and the third parallel protector 110C may be a transient voltage suppressor (TVS), a gas discharge tube (GDT) or a varistor. However, the types of the first parallel protector 110A, the second parallel protector 110B and the third parallel protector 110C do not limit the scope of the present invention.

Meanwhile, the processor 130 is further configured to monitor the first current I1, the second current I2 and the third current I3 through the first current sensor 120A, the second current sensor 120B and the third current sensor 120C, thereby determining the actual discharging path of a power surge. For example, if the values of the first current I1 and the second current I2 are substantial and the value of the third current I3 is negligible, it indicates that the surge discharging path mainly passes through the first parallel protector 110A and the second parallel protector 110B, and seldom passes through the third parallel protector 110C. On the other hand, if the value of the third current I3 is substantial, it indicates that the surge discharging path mainly passes through the third parallel protector 110C and arrives at the ground GND.

In some embodiments, different causes of power surges result in different surge discharging paths. For example, when a lighting-induced common mode power surge occurs on both the first power line PL1 and the second power line PL2, the surge voltage seeks an earth ground return discharging path which sequentially includes the first power line PL1, the second power line PL2, the first parallel protector 110A, the second parallel protector 110B, the third parallel protector 110C and the ground GND. On the other hand, when a differential mode power surge occurs on either the first power line PL1 or the second power line PL2, such as due to the loading current of a motor or another device, the surge discharging path mainly passes through the first parallel protector 110A and the second parallel protector 110B, and seldom passes through the third parallel protector 110C. Therefore, in some embodiments, the processor 130 is further configured to determine the cause of a power surge based on the surge discharging path.

In some embodiments, the processor 130 may include a data processing unit 132 configured to record, process and analyze the data transmitted from the first current sensor 120A, the second current sensor 120B and the third current sensor 120C. Also in some embodiments, the processor 130 may further include a wired transmission module 134 and/or a wireless transmission module 136 each configured to transmit the data recorded by the data processing unit 132 to a remote monitoring system CS1, thereby allowing a user to perform more complex data analysis remotely.

In the embodiment depicted in FIG. 1, the power management system 100 may further includes an isolation power supply 140, a stabilizer backup circuit 150, and a stabilizer circuit 160. The isolation power supply 140 may be coupled to the first power line PL1 and the second power line PL2, and configured to convert the AC power into a direct-current (DC) power. The stabilizer backup circuit 150 may be coupled to the isolation power supply 140 and configured to provide a stabilizing power according to the DC power. The stabilizer circuit 160 may be coupled to the stabilizer backup circuit 150 and configured to provide a voltage required by the processor 130 according to the stabilizing power. In some embodiments, the stabilizer backup circuit 150 may provide a 12V voltage, and the stabilizer circuit 160 may provide a 3.3V voltage. However, the value of the power provided by the stabilizer backup circuit 150 or the stabilizer circuit 160 does not limit the scope of the present invention.

In this embodiment, the stabilizer backup circuit 150 is further configured to continue to provide the stabilizing power during a period (for example, 3 seconds) after the power management system 100 encounters a blackout. During the power failure period of the power management system 100, the processor 130 can record power data of the power management system 100, establish connection with the remote monitoring system. CS1 using the wired transmission module 134 and/or the wireless transmission module 136, and transmit the recorded power data to the remote monitoring system CS1. Therefore, a user can monitor the operational status the power management system 100 remotely, thereby taking immediate action or being informed of a blackout when a power surge occurs.

In the power management system 100 of the present invention, the first current sensor 120A, the second current sensor 120B and the third current sensor 120C are capable of sensing the current flowing through the first parallel protector 110A, the second parallel protector 110B and the third parallel protector 110C when disposed without contacting the first parallel protector 110A, the second parallel protector 110B and the third parallel protector 110C. When a power surge occurs, the processor 130 can record the complete current waveform on a real-time basis for determining the surge discharging path. Therefore, the user can analyze the cause of the power surge based on the data provided by the power management system 100.

Figure 2:
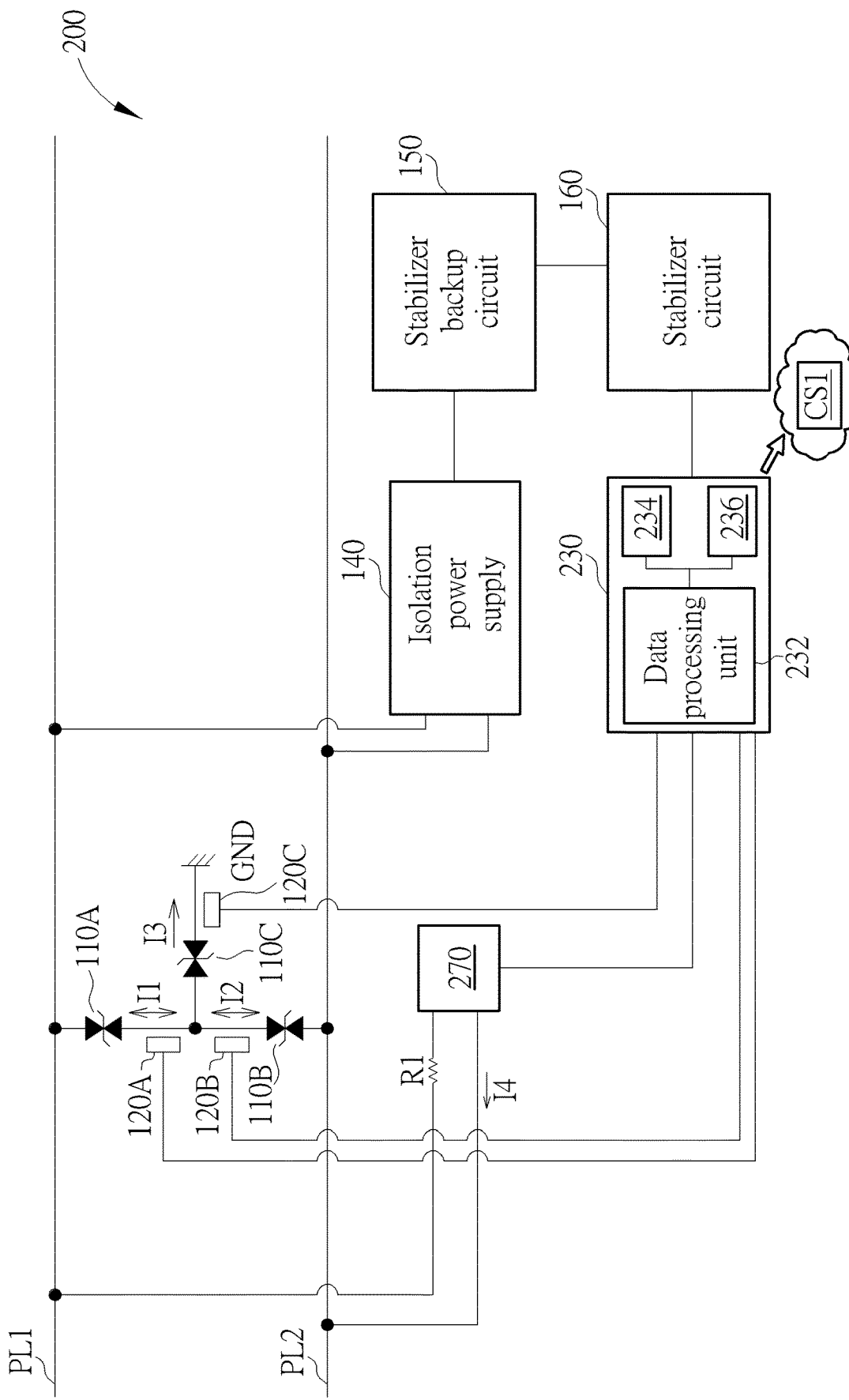
FIG. 2 is a diagram illustrating a power management system according to another embodiment of the present invention.

FIG. 2 is a diagram illustrating a power management system 200 according to another embodiment of the present invention. The structure and operation of the power management system 200 are similar to those of the power management system 100, but the power management system 200 further includes a limiting resistor R1 and a voltage sensor 270.

The limiting resistor R1 includes a first end coupled to the first power line PL1 and a second end coupled to the second power line PL2. The voltage sensor 270 is configured to sense a fourth current I4 flowing through the limiting resistor R1, thereby acquiring the voltage established across the limiting resistor R1. In some embodiments, the resistance of the limiting resistor R1 may be determined based on the specification of the voltage sensor 270. For example, if the voltage sensor 270 is mainly used to detect the current around 25 mA, the resistance of the limiting resistor R1 may be set to an appropriate value based on the AC power.

Figure 3:
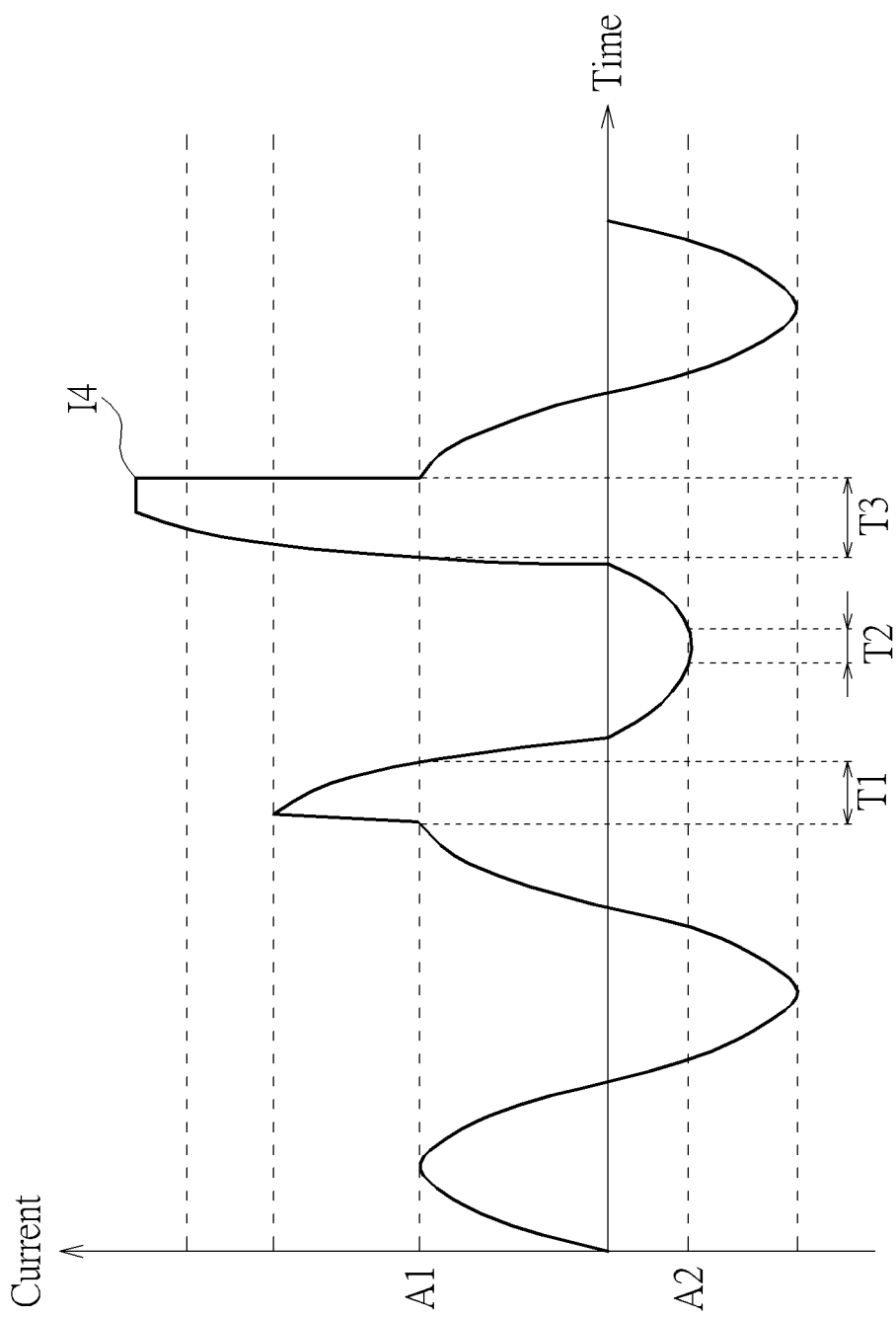
FIG. 3 is a diagram illustrating a current waveform during the operation of a power management system according to an embodiment of the present invention.

FIG. 3 is a diagram illustrating the waveform of the fourth current I4 during the operation of the power management system 200 according to an embodiment of the present invention. Since the waveform of the fourth current I4 varies with the voltage waveform of the first power line PL1 associated with the AC power, a data processing unit 232 in the processor 230 may record the waveform of the fourth current I4 and the value of the fourth current I4 at a corresponding time, thereby providing the user with information associated with the AC power. In some embodiments, the processor 230 may further record the anomaly when the value of the fourth current I4 is outside a predetermined range, for example when the value of the fourth current I4 exceeds an upper limit A1 of the predetermined range during a period T1 or when the value of the fourth current I4 drops below a lower limit A2 of the predetermined range during a period T2. The above-mentioned anomaly may be sent to the remote monitoring system CS1 using a wired transmission module 234 and/or the wireless transmission module 236.

In other words, the power management system 200 can continuously monitor the AC power provided on the first power line PL1 and the second power line PL2 using a voltage sensor 270. When a power surge occurs during a period T3 as depicted in FIG. 3, the processor 230 is configured to continuously record the waveform of the fourth current I4 and record the current waveform on the surge discharging path through the first current sensor 120A, the second current sensor 120B and the third current sensor 120C, thereby providing the user with more information for subsequent analysis on the cause of the power surge.

In conclusion, the present power management system can sense the current flowing through the parallel protectors using Hall current sensors. When a power surge occurs, the processor can record the complete current waveform on a real-time basis for determining the surge discharging path for subsequent analysis on the cause of the power surge. Also, the present power management system can continuously monitor the waveform of the AC power and send an alarm message when the voltage of the AC power is outside a predetermined range, thereby allowing the user to take immediate action.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power management system, comprising:
   a first power line and a second power line for transmitting an alternative-current (AC) power;
   a first parallel protector including:
      a first end coupled to the first power line; and
      a second end;
   a second parallel protector including:
      a first end coupled to the second end of the first parallel protector; and
      a second end coupled to the second power line;
   a third parallel protector including:
      a first end coupled to the second end of the first parallel protector; and
      a second end coupled to a ground;
   a first current sensor configured to sense a first current flowing through the first parallel protector;
   a second current sensor configured to sense a second current flowing through the second parallel protector;
   a third current sensor configured to sense a third current flowing through the third parallel protector; and
   a processor coupled to the first current sensor, the second current sensor and the third current sensor, and configured to detect a surge discharging path according to at least the first current, the second current and/or the third current.

2. The power management system of claim 1, wherein:
   the first parallel protector further includes a first transient voltage suppressor (TVS), a first gas discharge tube (GDT) or a first varistor;
   the second parallel protector further includes a second TVS, a second GDT or a second varistor; and
   the third parallel protector further includes a third TVS, a third GDT or a third varistor.

3. The power management system of claim 1, wherein the first current sensor, the second current sensor and the third current sensor are Hall sensors.

4. The power management system of claim 1, wherein the processor is further configured to determine a cause of a surge based on the surge discharging path.

5. The power management system of claim 1, further comprising:
   a limiting resistor including a first end coupled to the first power line and a second end coupled to the second power line; and
   a voltage sensor configured to detect a fourth current flowing through the limiting resistor.

6. The power management system of claim 5, wherein the processor is further configured to:
   record a waveform of the fourth current and a value of the fourth current at a corresponding time; and
   send an alarm signal when the value of the fourth current is outside a predetermined range.

7. The power management system of claim 1, further comprising:
   an isolation power supply coupled to the first power line and the second power line, and configured to convert the AC power into a direct-current (DC) power;
   a stabilizer backup circuit coupled to the isolation power supply and configured to:
      provide a stabilizing power according to the DC power; and
      continue to provide the stabilizing power during a period after the power management system encounters a blackout; and
   a stabilizer circuit coupled to the stabilizer backup circuit and configured to provide a voltage required by the processor according to the stabilizing power.

8. The power management system of claim 7, wherein during the period after the power management system encounters the blackout, the processor is further configured to record a power data of the power management system and transmit the power data to a remote monitoring system.

* * * * *